United States Patent
Ee et al.

(10) Patent No.: US 12,093,984 B2
(45) Date of Patent: Sep. 17, 2024

(54) METHOD AND SYSTEM FOR MANAGING DATA CONTRACTS

(71) Applicant: JPMorgan Chase Bank, N.A., New York, NY (US)

(72) Inventors: Wooyong Ee, Frisco, TX (US); Jooi-Teong Chuah, East Brunswick, NJ (US); Samip Chakraborty, Bangalore (IN); Praveen Pathiyil, Bengaluru (IN); Anand Sharma, Bengaluru (IN); Stephen C Bossong, West Grove, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 316 days.

(21) Appl. No.: 17/348,187

(22) Filed: Jun. 15, 2021

(65) Prior Publication Data

US 2022/0351260 A1    Nov. 3, 2022

(30) Foreign Application Priority Data

Apr. 30, 2021   (IN) .............................. 202111019842

(51) Int. Cl.
*G06Q 30/04*   (2012.01)
*G06F 16/2455*   (2019.01)
*G06F 16/2458*   (2019.01)

(52) U.S. Cl.
CPC ....... *G06Q 30/04* (2013.01); *G06F 16/24568* (2019.01); *G06F 16/2462* (2019.01)

(58) Field of Classification Search
CPC .............. G06Q 30/04; G06F 16/24568; G06F 16/2462
See application file for complete search history.

(56) References Cited

U.S. PATENT DOCUMENTS

| | | | |
|---|---|---|---|
| 2016/0085544 A1* | 3/2016 | Sharma | G06F 8/20 717/120 |
| 2021/0271649 A1* | 9/2021 | Narayanaswami | G06F 21/6254 |
| 2021/0398232 A1* | 12/2021 | Slavin | G06Q 50/18 |
| 2022/0121731 A1* | 4/2022 | Groth | G06F 21/6263 |

OTHER PUBLICATIONS

Xiao et al., "PrivacyGuard: Enforcing Private Data Usage Control with Blockchain and Attested Off-Chain Contract Execution" In European Symposium on Research in Computer Security, pp. 610-629 (Year: 2020).*

* cited by examiner

*Primary Examiner* — Resha Desai
*Assistant Examiner* — Patrick Kim
(74) *Attorney, Agent, or Firm* — Greenblum & Bernstein, P.L.C.

(57) ABSTRACT

A method for facilitating automated enforcement of a data publication and usage contract is provided. The method includes capturing a data contract from data that is published by a data service provider, the data contract including a data contract element; converting the captured data contract into a predetermined file format; retrieving metadata that correspond to the data, the metadata including usage information that relates to a consumption of the data by a data consumer; validating the retrieved metadata based on the converted data contract; and automatically initiating an enforcement action based on a result of the validating.

20 Claims, 6 Drawing Sheets

METHOD AND SYSTEM FOR MANAGING DATA CONTRACTS

CROSS-REFERENCE TO RELATED APPLICATIONS

This application claims priority benefit from Indian Application No. 202111019842, filed Apr. 30, 2021, which is hereby incorporated by reference in its entirety.

BACKGROUND

1. Field of the Disclosure

This technology generally relates to methods and systems for managing data contracts, and more particularly to methods and systems for capturing data publication and usage contracts in a machine-readable format to facilitate automated enforcement of contractual requirements.

2. Background Information

Many business entities manage and process large quantities of data as part of required business functions. To facilitate the exchange of the large quantities of data, data contracts such as, for example, data publication and usage contracts between data publishers and data consumers are often used. The data contracts are loose business requirements and agreements that describe the content, usage, and quality of provided data. Historically, conventional processing of the data contracts has resulted in varying degrees of success with respect to enforcing contractual requirements.

One drawback of conventional techniques for processing the data contracts is that in many instances, the data contracts are typically captured out-of-band in a data format such as, for example, a text document format and/or a spreadsheet format that is not machine readable. As a result, a human is required to manually enforce the contractual requirements as well as manage the data contracts. In addition, due to the manual nature of data contract enforcement, potential for enforcement errors and cost overruns increase when data transactions increase.

Therefore, there is a need for a data contract management process to capture contractual elements of data publication and usage contracts in a machine-readable format to facilitate automated enforcement of contractual requirements.

SUMMARY

The present disclosure, through one or more of its various aspects, embodiments, and/or specific features or sub-components, provides, inter alia, various systems, servers, devices, methods, media, programs, and platforms for capturing data publication and usage contracts in a machine-readable format to facilitate automated enforcement of contractual requirements.

According to an aspect of the present disclosure, a method for facilitating automated enforcement of a data publication and usage contract is provided. The method is implemented by at least one processor. The method may include capturing at least one data contract from data that is published by a data service provider, the at least one data contract may include at least one data contract element; converting the captured at least one data contract into a predetermined file format; retrieving metadata that correspond to the data, the metadata may include usage information that relates to a consumption of the data by a data consumer; validating the retrieved metadata based on the converted at least one data contract; and automatically initiating at least one enforcement action based on a result of the validating.

In accordance with an exemplary embodiment, the at least one data contract may correspond to at least one from among a business requirement and a business agreement that describes a content of the data, a usage of the data, and a quality of the data.

In accordance with an exemplary embodiment, the predetermined file format may include a computer file format that is machine-readable and human-readable.

In accordance with an exemplary embodiment, the retrieved metadata may include usage meta-statistics that correspond to the at least one data contract element, the at least one data contract element may include information that corresponds to at least one from among a context of usage and a quality of the data.

In accordance with an exemplary embodiment, the method may further include determining at least one dependency based on the retrieved metadata, the at least one dependency may relate to a data usage dependency between the data service provider and the data consumer; compiling dependency data that corresponds to the at least one dependency; and associating the dependency data with the data service provider and the data consumer.

In accordance with an exemplary embodiment, for the validating, the method may further include comparing each of the at least one data contract element in the converted at least one data contract to a corresponding element in the retrieved metadata; determining at least one violation of the converted at least one data contract based on a result of the comparison; and compiling violation data that corresponds to the determined at least one violation.

In accordance with an exemplary embodiment, the method may further include determining the at least one enforcement action based on the at least one violation and at least one predetermined criterion, the at least one predetermined criterion may relate to a business guideline; and authorizing the determined at least one enforcement action.

In accordance with an exemplary embodiment, the determined at least one enforcement action may include at least one from among a resolution action and an alert action that corresponds to the at least one violation.

In accordance with an exemplary embodiment, the resolution action may include at least one from among an adjustment action to adjust the at least one data contract element and a recertification action to recertify the at least one data contract after expiration.

In accordance with an exemplary embodiment, the alert action may include a notification that is displayed via a graphical user interface, the notification may include the compiled violation data that corresponds to the at least one violation.

According to an aspect of the present disclosure, a computing device configured to implement an execution of a method for facilitating automated enforcement of a data publication and usage contract is disclosed. The computing device comprising a processor; a memory; and a communication interface coupled to each of the processor and the memory, wherein the processor may be configured to capture at least one data contract from data that is published by a data service provider, the at least one data contract may include at least one data contract element; convert the captured at least one data contract into a predetermined file format; retrieve metadata that correspond to the data, the metadata may include usage information that relates to a consumption of the data by a data consumer; validate the retrieved metadata based on the converted at least one data contract; and automatically initiate at least one enforcement action based on a result of the validation.

In accordance with an exemplary embodiment, the at least one data contract may correspond to at least one from among a business requirement and a business agreement that describes a content of the data, a usage of the data, and a quality of the data.

In accordance with an exemplary embodiment, the predetermined file format may include a computer file format that is machine-readable and human-readable.

In accordance with an exemplary embodiment, the retrieved metadata may include usage meta-statistics that correspond to the at least one data contract element, the at least one data contract element may include information that corresponds to at least one from among a context of usage and a quality of the data.

In accordance with an exemplary embodiment, the processor may be further configured to determine at least one dependency based on the retrieved metadata, the at least one dependency may relate to a data usage dependency between the data service provider and the data consumer; compile dependency data that corresponds to the at least one dependency; and associate the dependency data with the data service provider and the data consumer.

In accordance with an exemplary embodiment, for the validating, the processor may be further configured to compare each of the at least one data contract element in the converted at least one data contract to a corresponding element in the retrieved metadata; determine at least one violation of the converted at least one data contract based on a result of the comparison; and compile violation data that corresponds to the determined at least one violation.

In accordance with an exemplary embodiment, the processor may be further configured to determine the at least one enforcement action based on the at least one violation and at least one predetermined criterion, the at least one predetermined criterion may relate to a business guideline; and authorize the determined at least one enforcement action.

In accordance with an exemplary embodiment, the determined at least one enforcement action may include at least one from among a resolution action and an alert action that corresponds to the at least one violation.

In accordance with an exemplary embodiment, the resolution action may include at least one from among an adjustment action to adjust the at least one data contract element and a recertification action to recertify the at least one data contract after expiration.

In accordance with an exemplary embodiment, the alert action may include a notification that is displayed via a graphical user interface, the notification may include the compiled violation data that corresponds to the at least one violation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
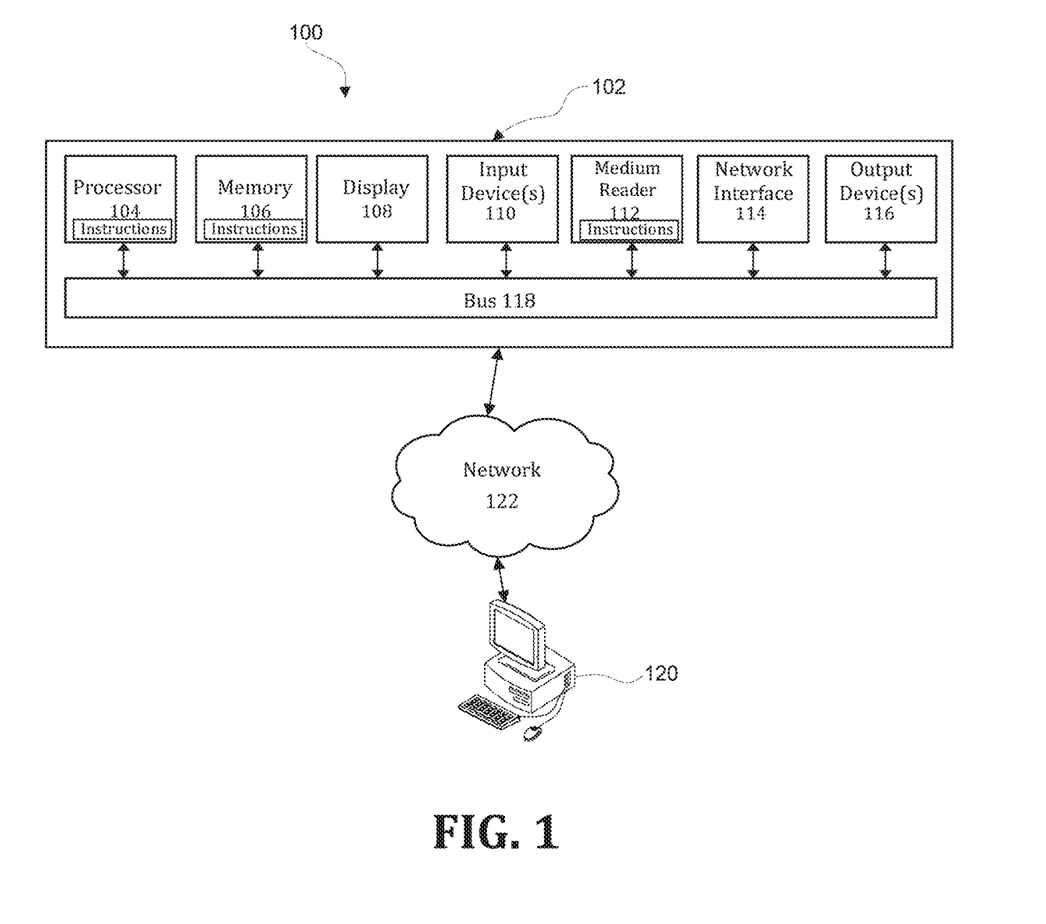
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for capturing data publication and usage contracts in a machine-readable format to facilitate automated enforcement of contractual requirements.

Figure 2:
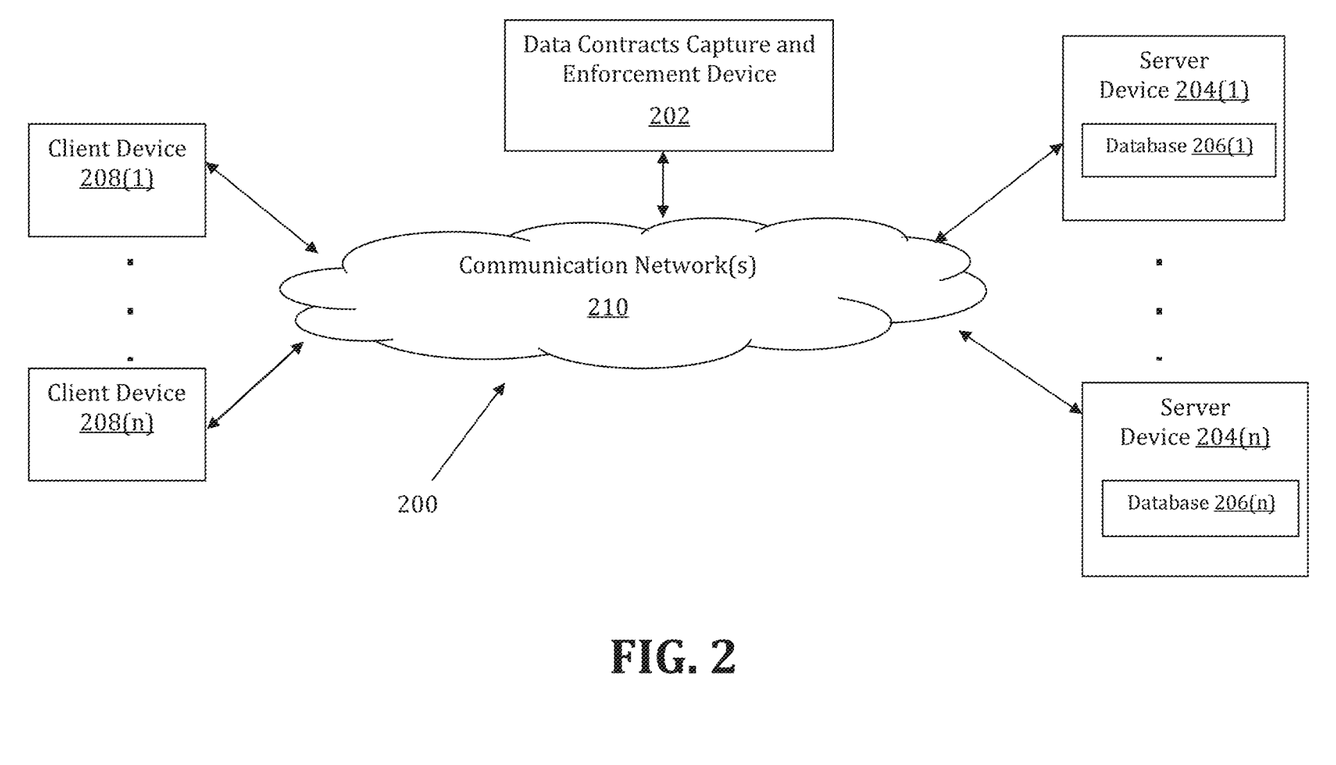
FIG. 2 illustrates an exemplary diagram of a network environment.

Referring to FIG. 2, a schematic of an exemplary network environment 200 for implementing a method for capturing data publication and usage contracts in a machine-readable format to facilitate automated enforcement of contractual requirements is illustrated. In an exemplary embodiment, the method is executable on any networked computer platform, such as, for example, a personal computer (PC).

The method for capturing data publication and usage contracts in a machine-readable format to facilitate automated enforcement of contractual requirements may be implemented by a Data Contracts Capture and Enforcement (DCCE) device 202. The DCCE device 202 may be the same or similar to the computer system 102 as described with respect to FIG. 1. The DCCE device 202 may store one or more applications that can include executable instructions that, when executed by the DCCE device 202, cause the DCCE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DCCE device 202 itself, may be located in virtual server(s) running in a cloud-based computing environment rather than being tied to one or more specific physical network computing devices. Also, the application(s) may be running in one or more virtual machines (VMs) executing on the DCCE device 202. Additionally, in one or more embodiments of this technology, virtual machine(s) running on the DCCE device 202 may be managed or supervised by a hypervisor.

In the network environment 200 of FIG. 2, the DCCE device 202 is coupled to a plurality of server devices 204(1)-204(n) that hosts a plurality of databases 206(1)-206(n), and also to a plurality of client devices 208(1)-208(n) via communication network(s) 210. The server devices 204(1)-204(n) may include at least one publisher device that sends a plurality of messages to a subscriber device. The client devices 208(1)-208(n) may include at least one subscriber device that receives a plurality of published messages from a publisher device. A communication interface of the DCCE device 202, such as the network interface 114 of the computer system 102 of FIG. 1, operatively couples and communicates between the DCCE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DCCE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DCCE devices that efficiently implement a method for capturing data publication and usage contracts in a machine-readable format to facilitate automated enforcement of contractual requirements.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCCE device 202 may be a standalone device or integrated with one or more other devices or apparatuses, such as one or more of the server devices 204(1)-204(n), for example. In one particular example, the DCCE device 202 may include or be hosted by one of the server devices 204(1)-204(n), and other arrangements are also possible. Moreover, one or more of the devices of the DCCE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DCCE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data contracts, data publication contracts, data usage contracts, data contract elements, business artifacts, metadata, meta-statistics, human-readable file formats, and computer-readable file formats.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DCCE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DCCE device 202 via the communication network(s)210 in order to communicate user requests and information. The client devices 208(1)-208(n) may further include, among other features, a display device, such as a display screen or touchscreen, and/or an input device, such as a keyboard, for example.

Although the exemplary network environment 200 with the DCCE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DCCE device 202, the server devices 204(1)-204(n), or the client devices 208(1)-208(n), for example, may be configured to operate as virtual instances on the same physical machine. In other words, one or more of the DCCE device 202, the server devices 204(1)-204(n), or the client devices 208(1)-208(n) may operate on the same physical device rather than as separate devices communicating through communication network(s) 210. Additionally, there may be more or fewer DCCE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
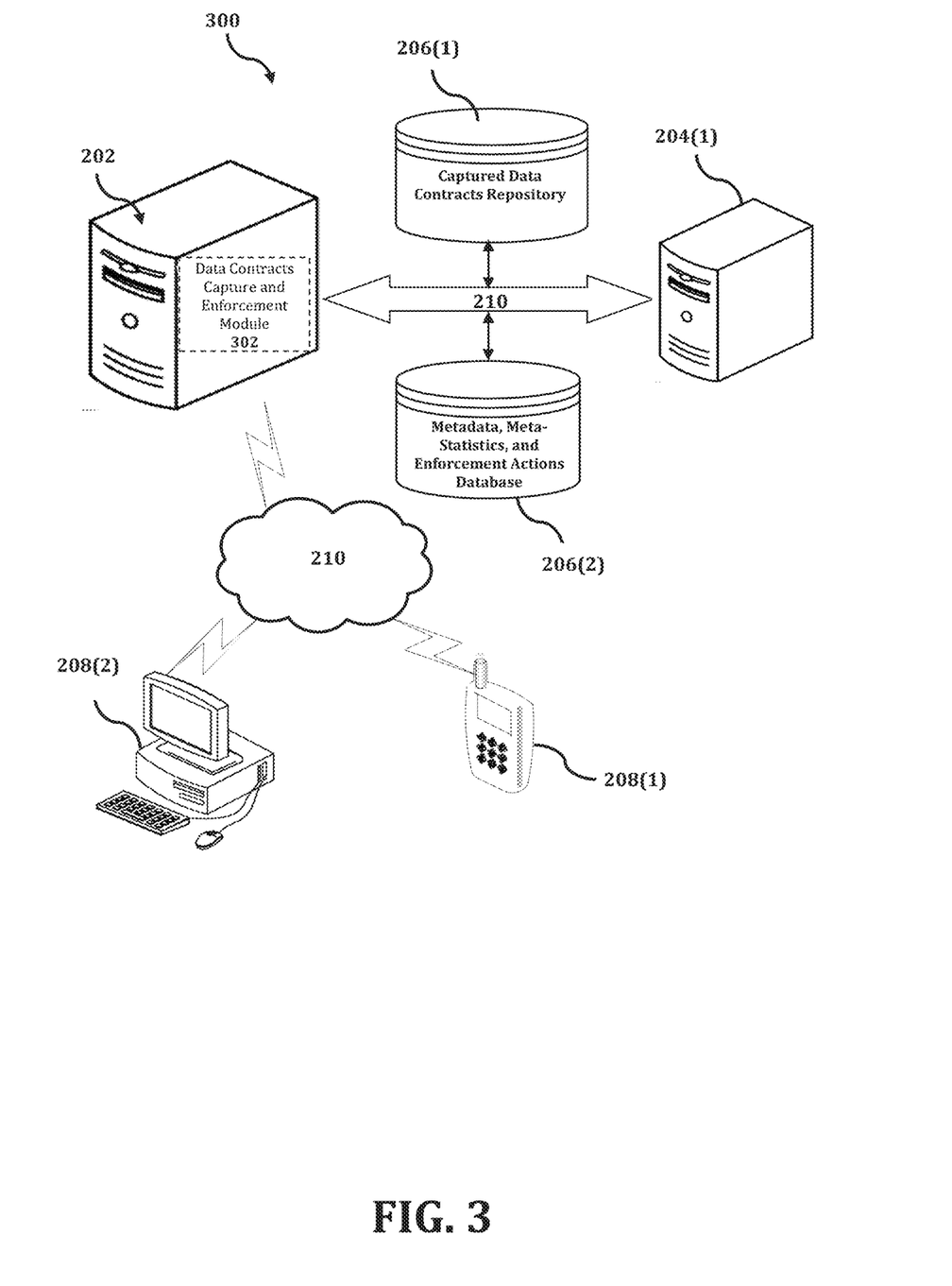
FIG. 3 shows an exemplary system for implementing a method for capturing data publication and usage contracts in a machine-readable format to facilitate automated enforcement of contractual requirements.

The DCCE device 202 is described and shown in FIG. 3 as including a data contracts capture and enforcement module 302, although it may include other rules, policies, modules, databases, or applications, for example. As will be described below, the data contracts capture and enforcement module 302 is configured to implement a method for capturing data publication and usage contracts in a machine-readable format to facilitate automated enforcement of contractual requirements.

An exemplary process 300 for implementing a mechanism for capturing data publication and usage contracts in a machine-readable format to facilitate automated enforcement of contractual requirements by utilizing the network environment of FIG. 2 is shown as being executed in FIG. 3. Specifically, a first client device 208(1) and a second client device 208(2) are illustrated as being in communication with DCCE device 202. In this regard, the first client device 208(1) and the second client device 208(2) may be "clients" of the DCCE device 202 and are described herein as such. Nevertheless, it is to be known and understood that the first client device 208(1) and/or the second client device 208(2) need not necessarily be "clients" of the DCCE device 202, or any entity described in association therewith herein. Any additional or alternative relationship may exist between either or both of the first client device 208(1) and the second client device 208(2) and the DCCE device 202, or no relationship may exist.

Further, DCCE device 202 is illustrated as being able to access a captured data contracts repository 206(1) and a metadata, meta-statistics, and enforcement actions database 206(2). The data contracts capture and enforcement module 302 may be configured to access these databases for implementing a method for capturing data publication and usage contracts in a machine-readable format to facilitate automated enforcement of contractual requirements.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DCCE device 202 via broadband or cellular communication. Of course, these embodiments are merely exemplary and are not limiting or exhaustive.

Upon being started, the data contracts capture and enforcement module 302 executes a process for capturing data publication and usage contracts in a machine-readable format to facilitate automated enforcement of contractual requirements. An exemplary process for capturing data publication and usage contracts in a machine-readable format to facilitate automated enforcement of contractual requirements is generally indicated at flowchart 400 in FIG. 4.

Figure 4:
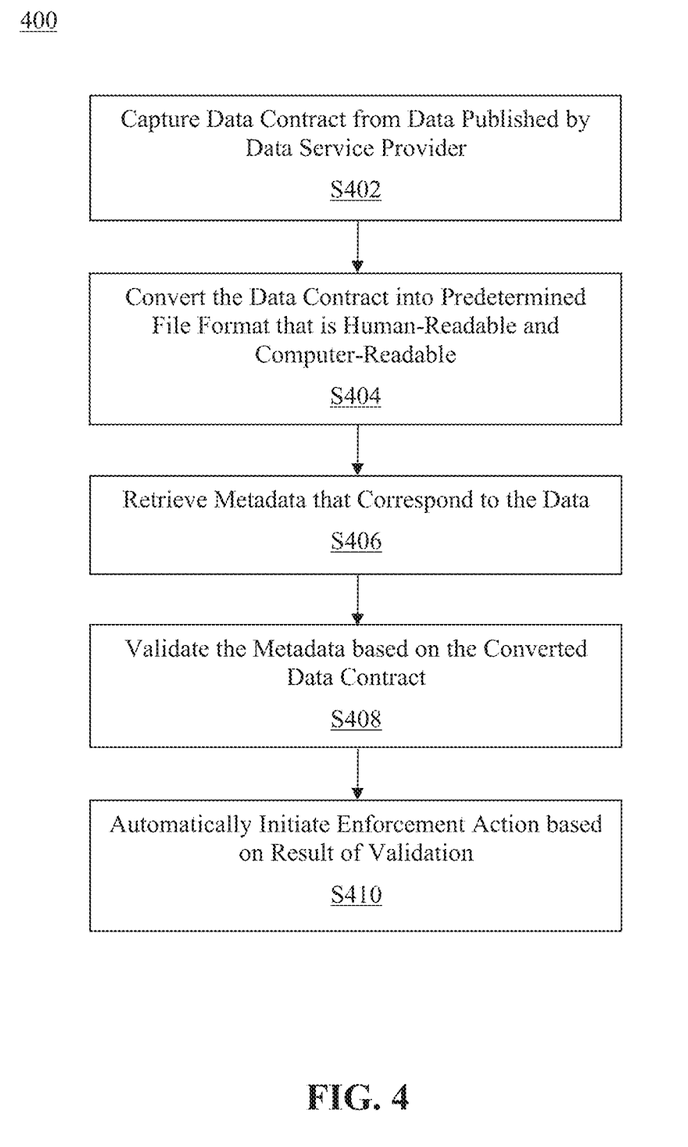
FIG. 4 is a flowchart of an exemplary process for implementing a method for capturing data publication and usage contracts in a machine-readable format to facilitate automated enforcement of contractual requirements.

In the process 400 of FIG. 4, at step S402, a data contract may be captured from data that is published by a data service provider. In an exemplary embodiment, the data contract may be captured from an existing data stream between the data service provider and a data consumer. For example, the data contracts capture and enforcement module 302 may be implemented within an enterprise network environment to collect information from existing data stream A to capture corresponding data contract A. In another exemplary embodiment, the data contract may be captured from a data request that is initiated by the data service provider and/or the data consumer. For example, the data contracts capture and enforcement module 302 may capture data requests between a data consumer and a data service provider to capture a corresponding data contract. In another exemplary embodiment, the data contracts may be manually provided by an administrator as a part of the data stream initiation process.

In another exemplary embodiment, the data contract may correspond to at least one from among a business requirement and a business agreement that describes a content of the data, a usage of the data, and a quality of the data. The data contract may govern business processes and business uses of data content as well as setting data quality expectations. In another exemplary embodiment, the data quality expectations may include at least one from among a coverage expectation, a timeliness expectation, and an accuracy expectation. The coverage expectation may correspond to source information such as, for example, whether all the data sources are sending the reporting into the data lake, whether all the servers and/or hosts are being heard for a given source, and whether there are any gaps in the data received for each of the source and/or host when compared to the intended schedule.

In another exemplary embodiment, the data contract may include at least one from among a service level agreement (SLA), a service level objective (SLO), and a service level indicator (SLI). The SLA may correspond to an agreement between a data service provider and a data consumer that relates to measurable metrics such as, for example, uptime, responsiveness, and responsibilities. The SLO may correspond to an agreement within an SLA that relates to a specific measurable metric such as, for example, a specific uptime requirement and a specific responsiveness requirement. The SLI may correspond to a compliance measure that relates to the specific metric in the SLO.

In another exemplary embodiment, the data contract may correspond to at least one from among a publisher type data contract, a consumption type data contract, a transport and/or carrier type data contract, and a customer type data contract such as, for example, a know your customer type data contract. The publisher type data contract may include information that relates to data service provider expectations of proper use for the data. The consumption type data contract may include information that relates to critical elements within the data, criticality of the data usage, and quality expectations for the data. For example, information that relates to the criticality of the data usage may include data corresponding to downstream impacts to the data consumer when the SLO is not met. The transport and/or carrier type data contract may include information that relates to an expectation of availability corresponding to the SLO. The customer type data contract may include information that relates to requirements for a specific customer.

In another exemplary embodiment, the data contract may include a data contract element such as, for example, a contractual requirement. The data contract element may correspond to information that relates to at least one from among parties to the data contract information, payload information, versioning information, effective date information, delivery timeliness requirements information, available requirements information, integrity requirements information, provenance information, validity period information, coverage and/or scope indicator information, and critical data elements information. The parties to the data contract information may include identifiers such as, for example, a security identifier (SID) and a federated identifier (FID) that identifies parties within the data contract. The payload information may include content information that identifies the payload. The effective data information may facilitate the enforcement of data retention policy for data at rest as well as for data in transit.

In another exemplary embodiment, the data contract may include a data designation such as, for example, a regulatory designation and a data privacy designation. The data designation may enable the enforcement of data entitlements as well as show an audit history of actions taken to re-certify a data contract without first going into access controls. In another exemplary embodiment, the data designation may facilitate the evaluation of privacy and secrecy requirements based on contract policy. The data designation may enable automated identification during transport and automated enforcement of requirements that the parties manage the data according to restrictions. The automated enforcement action may include at least one from among a purge action, a redact action, and a de-identify action.

In another exemplary embodiment, the data contract may include data transitivity information such as, for example, data chaining information. The data transitivity information may describe whether a subscriber becomes another publisher further downstream as well as whether any metadata from the original publisher is transitive in nature. By examining the collection of data contracts, an evaluation of relationships between contracts may be facilitated to ensure that there is no overstatement of commitments. For example, a subscriber to a data feed may only expect to be a service to what a given publisher has committed to in terms of quality expectations and patterns of use, but not more.

In another exemplary embodiment, the provenance information may include data lineage information that corresponds to a recursive data refinement process. The recursive data refinement process may relate to a process for progressively processing, republishing, and documenting the data.

In another exemplary embodiment, the recursive data refinement process may be facilitated by a novel assembly of tools within a data lake environment that recursively refines data by progressively processing, republishing, and documenting the data for use in machine learning applications. The recursive data refinement process may include receiving, via a data ingestion component, raw data that is published from a networked repository; generating a conformed data set from the raw data based on a conformation parameter; retrieving, via a communication interface, a feature configuration; generating, in real-time, a feature data set from the conformed data set based on the feature configuration; and publishing the feature data set, wherein the feature data set may be published to the data ingestion component for further processing.

In another exemplary embodiment, the data service provider and the data consumer may correspond to an application that includes at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real-time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the captured data contract may be converted into a predetermined file format. In an exemplary embodiment, the predetermined file format may include a computer file format that is machine-readable and human-readable. The predetermined file format may include at least one from among an open standard file format and a data interchange file format that uses human-readable text to store and transmit data objects. For example, the predetermined file format may include an extensible markup language (XML) file format and a JavaScript Object Notation (JSON) file format that consists of serializable values such as attribute-value pairs and array data types. In another exemplary embodiment, the predetermined file format may enable the leveraging of existing code versioning tools to automate the version controlling process for the captured data contract similar to how computer program source code is version controlled.

In another exemplary embodiment, the predetermined file format may include data structures such as, for example, an object, an array, a value, a string, a number, and a whitespace. The object may include an unordered set of name and value pairs. The array may include an ordered collection of values. The value may include at least one from among a string value, a number value, an object value, an array value, a true value, a false value, and a null value. The string may include a sequence of at least one character such as, for example, a Unicode character. The number may correspond to a codified number that does not include the octal and hexadecimal format. The whitespace may be inserted between any pair of tokens.

At step S406, metadata that correspond to the data may be retrieved. The metadata may include usage information that relates to a consumption of the data by a data consumer. In an exemplary embodiment, the metadata may include usage meta-statistics that correspond to the data contract element. The meta-statistics may include information that corresponds to at least one from among a context of usage and a quality of the data. In another exemplary embodiment, the metadata may include information that relates to data quality aspects of the data. As will be appreciated by a person of ordinary skill in the art, the metadata may include any set of data that describes and gives information about the data.

At step S408, the retrieved metadata may be validated based on the converted data contract. In an exemplary embodiment, the validation process may include comparing each of the data contract elements in the converted data contract to a corresponding element in the metadata. Then, a violation of the converted data contract may be determined based on a result of the comparison. In another exemplary embodiment, violation data that corresponds to the determined data contract violation may be compiled and persisted in a networked repository.

In another exemplary embodiment, when a violation of the data contract has been determined, an enforcement action may be determined based on the data contract violation and a predetermined criterion. The predetermined criterion may relate to a business guideline that corresponds to the data. For example, the predetermined criterion may relate to a data privacy business guideline that corresponds to the processing of regulated data. The business guideline may serve to restrict access to the regulated data when the data contract violation relates to an expired certification period for the regulated data. Then, the determined enforcement action may be authorized.

In another exemplary embodiment, the determined enforcement action may be authorized by a process that includes at least one from among a manual authorization process and an automatic authorization process. In the manual authorization process, a selectable graphical element may be presented to an administrator via a graphical user interface for acceptance of the determined enforcement action or for denial of the determined enforcement action. In the automatic authorization process, the determined enforcement action may be confirmed based on a predetermined authorization parameter.

At step S410, the authorized enforcement action may be automatically initiated based on a result of the validating. In an exemplary embodiment, the enforcement action may include at least one from among a resolution action and an alert action that corresponds to the data contract violation. The resolution action may include at least one from among an adjustment action to adjust the data contract element and a recertification action to recertify the data contract after expiration. For example, the resolution action may include an adjustment action to a frequency of data publication to lessen cost burdens associated with an overly optimistic SLA. The alert action may include a notification that is displayed via the graphical user interface. The notification on the graphical user interface may include the compiled violation data that corresponds to the data contract violation.

In another exemplary embodiment, a dependency may be determined based on the retrieved metadata. The dependency may include information that relates to a data usage dependency between the data service provider and the data consumer. Dependency data that corresponds to the determined dependency may be automatically compiled and persisted in a networked repository. In another exemplary embodiment, the dependency data may be associated with the data service provider and the data consumer. The association may include a correlation between the dependency data and an identifier that corresponds to at least one from among the data service provider and the data consumer.

Figure 5:
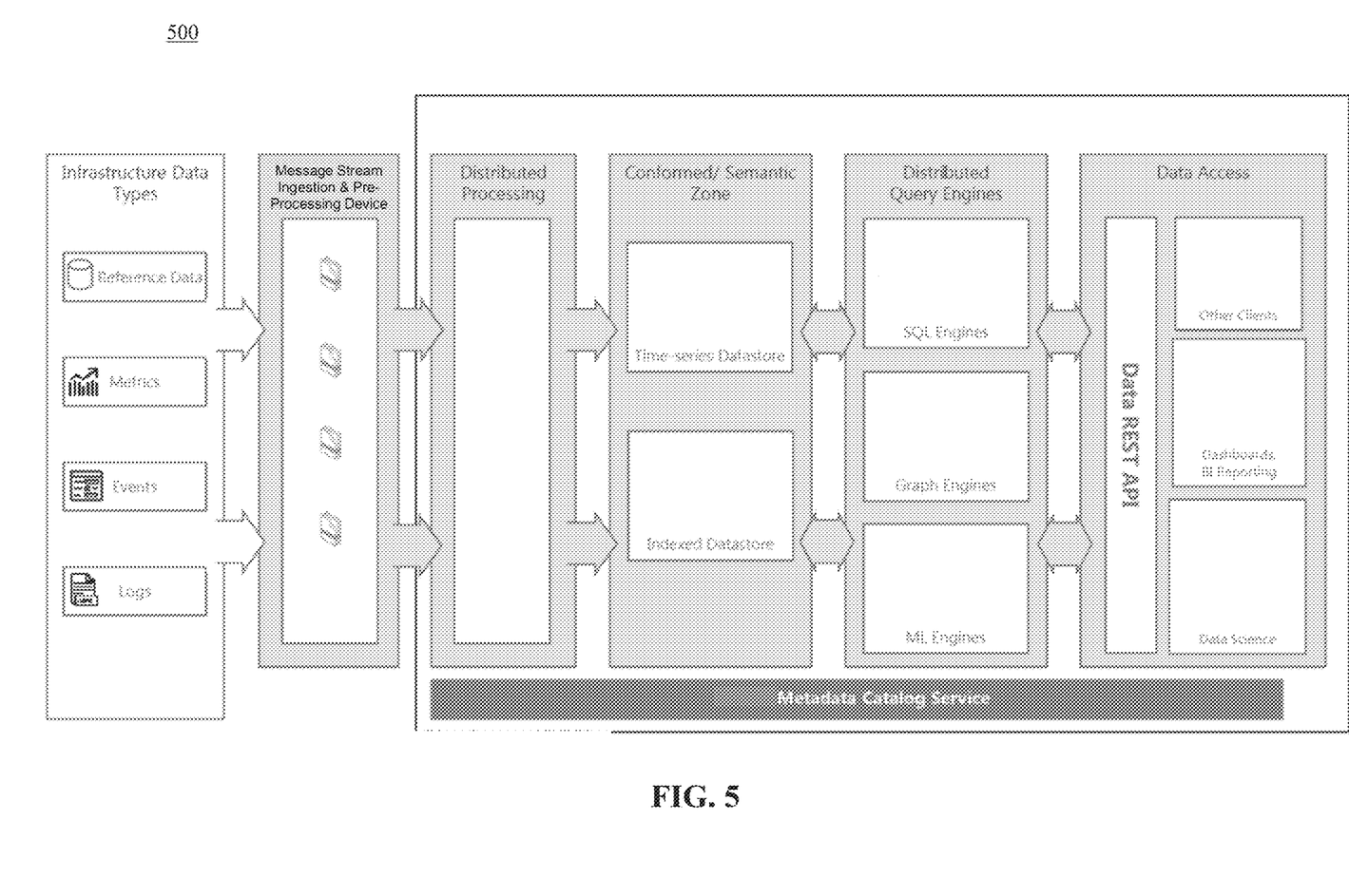
FIG. 5 is an architecture diagram that illustrates a framework that is usable for implementing a method for capturing data publication and usage contracts in a machine-readable format to facilitate automated enforcement of contractual requirements, according to an exemplary embodiment.

FIG. 5 is an architecture diagram 500 that illustrates a framework that is usable for implementing a method for capturing data publication and usage contracts in a machine-readable format to facilitate automated enforcement of contractual requirements, according to an exemplary embodiment. The framework of FIG. 5 represents an exemplary implementation of the disclosed data contracts capture and enforcement invention consistent with disclosures in the present application.

As illustrated in FIG. 5, infrastructure data types such as, for example, reference data, metric data, event data, and log data may be retrieved from a plurality of sources via a message stream ingestion and pre-processing device. The message stream ingestion and pre-processing device may include a communication system that transfers data between various computing components. The message stream ingestion and pre-processing device may then provide the ingested data to a distributed processing component. The distributed processing component may apply predetermined configurations to the ingested data and transmit the processed data to a conformed and/or semantic zone component. The conformed and/or semantic zone component may time persist the processed data into at least one from among a time-series based numerical datastore, a sequence based numerical datastore, and an indexed datastore. The metadata catalog service component may be utilized to store data contracts corresponding to the retrieved infrastructure data.

Next, distributed query engines such as, for example a structured query language (SQL) engine, a graph engine, and a machine learning engine may access the persisted data. The distributed query engines may further process the persisted data based on a predetermined user specification. The distributed query engines may then pass the processed data to a data access component. The data access component may utilize an application programming interface (API) such as, for example, a data representational state transfer (REST) API to enable access to the processed data for third-party clients, dashboards, data visualization, and data reporting, as well as for further processing by a data science component. As illustrated, the metadata catalog service component may be accessible by the distributed processing component, the conformed and/or semantic zone component, the distributed query engines, as well as the data access components.

In another exemplary embodiment, each of the data access points between a data publisher and a data consumer in the framework may be governed by a data contracts capture and enforcement component. The data contracts capture and enforcement component may capture data contracts such as, for example, a data publication and usage contract that guides the interaction between the data publisher and the data consumer. The captured data contracts may be converted into a predetermined file format such as, for example, a human-readable and computer-readable file format to facilitate automated enforcement of the captured data contracts. In another exemplary embodiment, the data contracts capture and enforcement component may identify a contract violation based on the converted data contract and corresponding metadata. Then, an enforcement action may be automatically initiated by the data contracts capture and enforcement component to resolve the identified contract violation.

Figure 6:
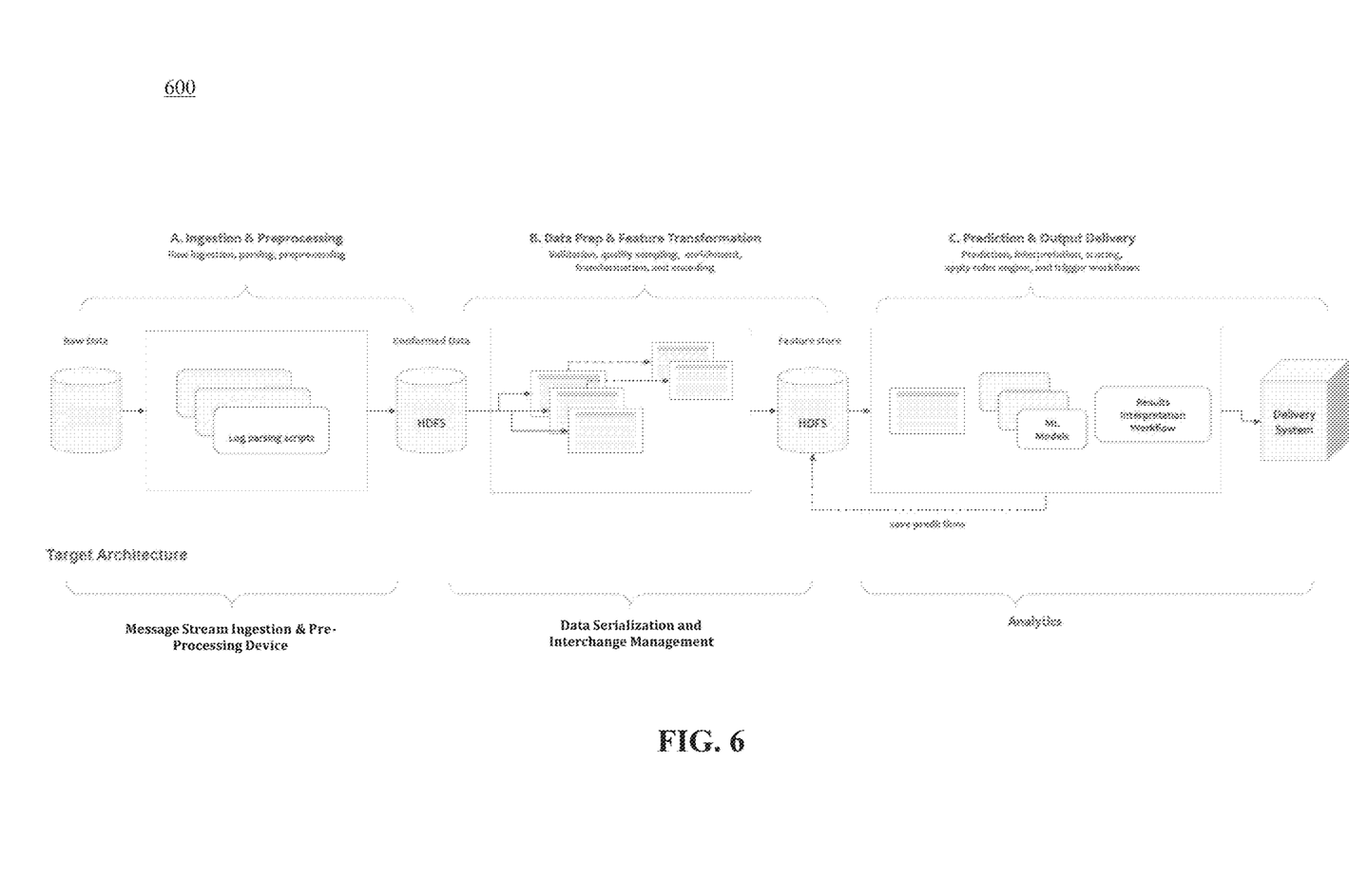
FIG. 6 is a diagram that illustrates an integrated architecture that is usable for implementing a method for capturing data publication and usage contracts in a machine-readable format to facilitate automated enforcement of contractual requirements, according to an exemplary embodiment.

FIG. 6 is a diagram 600 that illustrates an integrated architecture that is usable for implementing a method for capturing data publication and usage contracts in a machine-readable format to facilitate automated enforcement of contractual requirements, according to an exemplary embodiment. FIG. 6 provides a simplified view of a common architecture pattern that is usable to implement the disclosed invention.

As illustrated in FIG. 6, the architecture is comprised of processing stages that includes an ingestion and preprocessing stage, a data preparation and feature transformation stage, as well as a prediction and output delivery stage. In the ingestion and preprocessing stage, the raw data may be ingested, parsed, and preprocessed based on a predetermined configuration. Log parsing and ingestion may be ported to a component within the message stream ingestion and preprocessing device while preprocessed topics are available for persisting.

In the data preparation and feature transformation stage, the preprocessed data may be validated, sampled for quality, enriched, further transformed, and encoded for storage in a feature store. The preprocessed and conformed data may be available for easy access via a data API. Industrialized and scheduled processing environments may be provided to perform enrichment and feature transformation. The industrialized and scheduled processing environments may enable the saving of transformed features via an abstracted feature store by leveraging integrated republishing mechanisms.

In the prediction and output delivery stage, prediction techniques and rules may be applied to the data to interpret, score, and trigger workflows that rely on the processed data. The prediction pipeline may be hosted in an enterprise analytics platform. The enterprise analytics platform may initiate a runtime to access and retrieve prepared features as well as encoded lookups to run prediction models and store prediction outputs for later use. Results interpretation and resulting workflows such as, for example, generating and sending email alerts may be hosted and triggered within the prediction and output delivery stage.

In another exemplary embodiment, each of the data access points between a data publisher and a data consumer in the integrated architecture may be governed by a data contracts capture and enforcement component. The data contracts capture and enforcement component may capture data contracts such as, for example, a data publication and usage contract that guides the interaction between the data publisher and the data consumer. The captured data contracts may be converted into a predetermined file format such as, for example, a human-readable and computer-readable file format to facilitate automated enforcement of the captured data contracts. In another exemplary embodiment, the data contracts capture and enforcement component may identify a contract violation based on the converted data contract and corresponding metadata. Then, an enforcement action may be automatically initiated by the data contracts capture and enforcement component to resolve the identified contract violation.

Accordingly, with this technology, an optimized process for capturing data publication and usage contracts in a machine-readable format to facilitate automated enforcement of contractual requirements is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated enforcement of a data publication and usage contract, the method being implemented by at least one processor, the method comprising:
    capturing, by the at least one processor and from a data stream between a data service provider and a data consumer, at least one data contract from data that is published by the data service provider, the at least one data contract including at least one data contract element, and the at least one data contract is between the data service provided and the data consumer for utilizing target data of the data service provider, wherein the at least one data contract captured includes data transitivity information indicating whether the data consumer changes into a data publisher in a downstream process;
    performing recursive data refinement via an assembly of tools within a data lake environment, wherein the recursive data refinement progressively processes raw data that is initially unreadable by a machine, republishes the processed raw data, and document the republished data for readability by the machine, and wherein the recursive data refinement includes:
        receiving, via a data ingestion component, the raw data that is published from a networked repository;
        generating a conformed data set from the raw data based on a conformation parameter;
        retrieving, via a communication interface, a feature configuration;
        generating, in real-time, a feature data set from the conformed data set based on the feature configuration; and
        publishing the feature data set, wherein the feature data set is published to the data ingestion component;
    converting, by the at least one processor, the captured at least one data contract into a predetermined file format to enable leveraging of a code versioning tool for performing code versioning, wherein the predetermined file format is a machine readable format processable by a machine learning model;
    retrieving, by the at least one processor, metadata that correspond to the data, the metadata including usage information that relates to a consumption of the data by the data consumer;
    validating, by the at least one processor, the retrieved metadata based on the converted at least one data contract, wherein the validating includes comparing the at least one data contract element in the converted at least one data contract to a corresponding element in the metadata;
    transforming and encoding the validated metadata into at least one feature;
    predicting, using the machine learning model provided on an enterprise analytics platform and based on the at least one feature and a status of the data consumer as the data consumer or data publisher, a possibility of violation of the at least one data contract and storing the possibility of violation in a database as a prediction;
    updating, by the machine learning model, the stored prediction based on subsequent data published by the data service provider; and
    automatically initiating, by the at least one processor and based on an updated prediction, at least one enforcement action based on a result of the validating, wherein the at least one enforcement action includes restriction to the target data of the data service provider prior to a violation of the at least one data contract based on the updated prediction by the machine learning model.

2. The method of claim 1, wherein the at least one data contract corresponds to at least one from among a business requirement and a business agreement that describes a content of the data, a usage of the data, and a quality of the data.

3. The method of claim 1, wherein the predetermined file format is also human-readable.

4. The method of claim 1, wherein the retrieved metadata include usage meta-statistics that correspond to the at least one data contract element, the at least one data contract element including information that corresponds to at least one from among a context of usage and a quality of the data.

5. The method of claim 1, further comprising:
    determining, by the at least one processor, at least one dependency based on the retrieved metadata, the at least one dependency relating to a data usage dependency between the data service provider and the data consumer;
    compiling, by the at least one processor, dependency data that corresponds to the at least one dependency; and
    associating, by the at least one processor, the dependency data with the data service provider and the data consumer.

6. The method of claim 1, wherein the validating further comprises:
    comparing, by the at least one processor, each of the at least one data contract element in the converted at least one data contract to a corresponding element in the retrieved metadata;
    determining, by the at least one processor, at least one violation of the converted at least one data contract based on a result of the comparison; and
    compiling, by the at least one processor, violation data that corresponds to the determined at least one violation.

7. The method of claim 6, further comprising:
    determining, by the at least one processor, the at least one enforcement action based on the at least one violation and at least one predetermined criterion, the at least one predetermined criterion relating to a business guideline; and
    authorizing, by the at least one processor, the determined at least one enforcement action.

8. The method of claim 7, wherein the determined at least one enforcement action includes at least one from among a resolution action and an alert action that corresponds to the at least one violation.

9. The method of claim 8, wherein the resolution action includes at least one from among an adjustment action to adjust the at least one data contract element and a recertification action to recertify the at least one data contract after expiration.

10. The method of claim 8, wherein the alert action includes a notification that is displayed via a graphical user interface, the notification including the compiled violation data that corresponds to the at least one violation.

11. A computing device configured to implement an execution of a method for facilitating automated enforcement of a data publication and usage contract, the computing device comprising:
    a processor;
    a memory; and a communication interface coupled to each of the processor and the memory, wherein the processor is configured to:

capture, from a data stream between a data service provider and a data consumer, at least one data contract from data that is published by a data service provider, the at least one data contract including at least one data contract element, and the at least one data contract is between the data service provider and a data consumer for utilization of target data of the data service provider, wherein the at least one data contract captured includes data transitivity information indicating whether the data consumer changes into a data publisher in a downstream process;

perform recursive data refinement via an assembly of tools within a data lake environment, wherein the recursive data refinement progressively processes raw data that is initially unreadable by a machine, republishes the processed raw data, and document the republished data for readability by the machine, and wherein the recursive data refinement includes:

receiving, via a data ingestion component, the raw data that is published from a networked repository;

generating a conformed data set from the raw data based on a conformation parameter;

retrieving, via a communication interface, a feature configuration;

generating, in real-time, a feature data set from the conformed data set based on the feature configuration; and publishing the feature data set, wherein the feature data set is published to the data ingestion component;

convert the captured at least one data contract into a predetermined file format to enable leveraging of a code versioning tool for performing code versioning, wherein the predetermined file format is a machine readable format processable by a machine learning model;

retrieve metadata that correspond to the data, the metadata including usage information that relates to a consumption of the data by the data consumer;

validate the retrieved metadata based on the converted at least one data contract, wherein validation of the retrieved metadata includes comparing the at least one data contract element in the converted at least one data contract to a corresponding element in the metadata;

transform and encode the validated metadata into at least one feature;

predict, using the machine learning model provided on an enterprise analytics platform and based on the at least one feature and a status of the data consumer as the data consumer or data publisher, a possibility of violation of the at least one data contract and store the possibility of violation in a database as a prediction;

update, by the machine learning model, the stored prediction based on subsequent data published by the data service provider; and automatically initiate, based on an updated prediction, at least one enforcement action based on a result of the validation, wherein the at least one enforcement action includes automatic restriction to the target data of the data service provider prior to a violation of the at least one data contract based on the updated prediction by the machine learning model.

12. The computing device of claim 11, wherein the at least one data contract corresponds to at least one from among a business requirement and a business agreement that describes a content of the data, a usage of the data, and a quality of the data.

13. The computing device of claim 11, wherein the predetermined file format is also human-readable.

14. The computing device of claim 11, wherein the retrieved metadata include usage meta-statistics that correspond to the at least one data contract element, the at least one data contract element including information that corresponds to at least one from among a context of usage and a quality of the data.

15. The computing device of claim 11, wherein the processor is further configured to:

determine at least one dependency based on the retrieved metadata, the at least one dependency relating to a data usage dependency between the data service provider and the data consumer;

compile dependency data that corresponds to the at least one dependency; and associate the dependency data with the data service provider and the data consumer.

16. The computing device of claim 11, wherein, for the validating, the processor is further configured to:

compare each of the at least one data contract element in the converted at least one data contract to a corresponding element in the retrieved metadata;

determine at least one violation of the converted at least one data contract based on a result of the comparison; and compile violation data that corresponds to the determined at least one violation.

17. The computing device of claim 16, wherein the processor is further configured to:

determine the at least one enforcement action based on the at least one violation and at least one predetermined criterion, the at least one predetermined criterion relating to a business guideline; and authorize the determined at least one enforcement action.

18. The computing device of claim 17, wherein the determined at least one enforcement action includes at least one from among a resolution action and an alert action that corresponds to the at least one violation.

19. The computing device of claim 18, wherein the resolution action includes at least one from among an adjustment action to adjust the at least one data contract element and a recertification action to recertify the at least one data contract after expiration.

20. The computing device of claim 18, wherein the alert action includes a notification that is displayed via a graphical user interface, the notification including the compiled violation data that corresponds to the at least one violation.

* * * * *